(12) United States Patent
Oggian et al.

(10) Patent No.: US 7,307,535 B2
(45) Date of Patent: Dec. 11, 2007

(54) AIR COIL RF TRANSPONDER AND METHOD OF MAKING SAME

(75) Inventors: Sileno Oggian, Bedano (CH); Roberto Malfanti, Sonvico (CH); Takamasa Ishii, Ponte Capriasca (CH)

(73) Assignee: Datamars S.A. (CH)

( * ) Notice: Subject to any disclaimer, the term of this patent is extended or adjusted under 35 U.S.C. 154(b) by 366 days.

(21) Appl. No.: 10/899,869

(22) Filed: Jul. 27, 2004

(65) Prior Publication Data

US 2006/0022830 A1 Feb. 2, 2006

(51) Int. Cl.
*B08B 13/14* (2006.01)
*H01Q 7/00* (2006.01)
*H01Q 21/00* (2006.01)
*H01Q 1/32* (2006.01)
*H04B 1/03* (2006.01)

(52) U.S. Cl. .............................. 340/572.7; 340/572.1; 340/572.5; 340/572.6; 340/572.8; 343/866; 343/867; 343/868; 343/869; 343/714; 361/814; 361/815

(58) Field of Classification Search ............. 340/572.1, 340/572.5, 572.6, 572.7, 572.8; 343/745, 343/787, 850, 866–869; 235/492; 361/814–815
See application file for complete search history.

(56) References Cited

U.S. PATENT DOCUMENTS

| | | | | | |
|---|---|---|---|---|---|
| 5,025,550 | A | * | 6/1991 | Zirbes et al. | 29/605 |
| 5,814,986 | A | * | 9/1998 | Goskowicz et al. | 324/207.26 |
| 6,067,235 | A | * | 5/2000 | Finn et al. | 361/814 |
| 6,246,328 | B1 | * | 6/2001 | Parkinson et al. | 340/572.1 |
| 6,380,857 | B1 | * | 4/2002 | Galloway et al. | 340/572.8 |
| 6,412,722 | B1 | * | 7/2002 | Kreuser et al. | 242/288 |
| 6,496,154 | B2 | * | 12/2002 | Gyenes | 343/745 |
| 6,778,089 | B2 | * | 8/2004 | Yoakum | 340/572.8 |
| 7,019,711 | B2 | * | 3/2006 | Johnson et al. | 343/872 |
| 7,135,978 | B2 | * | 11/2006 | Gisselberg et al. | 340/572.5 |
| 2005/0172150 | A1 | * | 8/2005 | Schmitt | 713/200 |

* cited by examiner

*Primary Examiner*—Benjamin C. Lee
*Assistant Examiner*—Lam Pham
(74) *Attorney, Agent, or Firm*—Kenyon & Kenyon LLP

(57) ABSTRACT

An RF air coil transponder includes a rotatable carrier, such as a rigid reel. A coil is wound about the reel and at least one field influencing body for influencing the electric and/or the magnetic field within the coil is supported by the reel. The rigidity of the reel enables the coil to keep its form and guarantees precise distances between windings, especially when a winding machine forms the coil. Adjusting the angular position, shape, composition, size, and/or surface are of the body effects adjustment of the resonant frequency.

32 Claims, 3 Drawing Sheets

AIR COIL RF TRANSPONDER AND METHOD OF MAKING SAME

BACKGROUND OF THE INVENTION

This invention is related to RF transponders and, in particular, to RF air coil transponders and to methods of making the same.

In radio frequency identification systems, the resonant frequency of the transponders is one of the most important factors in the reading performance of the transponders. Precise resonant frequency of the transponders helps to guarantee the electrical functionality quality of the product.

Often, some transponders demonstrate different reading performance and this difference often comes from differences of the resonant frequencies. This, in turn, is often caused by the technology used. For example, for low frequency transponders, such as 125 kHz transponders, and middle frequency transponders, such as 13.56 MHz transponders, usually air coil technology is used.

Generally, in the manufacture of air coil transponders, the air coils are made from conventional single insulated wires, which typically are self-adhering. If self-adhesive wires are used, this could result in the coils being solid and difficult to be deformed if the number of windings is high. On the other hand, if the number of windings is low, such as 1 to 50 turns, the coil could be fragile and easily deformable. If the coil is deformed, impedance of the coil is also changed.

Further, every coil comprises inductance, resistance and parasitic capacitance. If the distance between wire turns and the wiring process differs from one transponder to another, the internal parasitic capacitance will also be different, resulting in differences between the impedances of the coils. This, in turn, results in a difference in resonant frequencies.

It is known to adjust the resonant frequency of transponders by changing the capacitance and/or changing the inductance of the resonant circuit of the transponders.

A very high Q (quality factor) resonant circuit is particularly effective in capturing high energy from the reading device and re-transmitting energy to the reading device, particularly at longer reading ranges. On the other hand, a high Q circuit does not allow for wide tolerances of resonant frequency because frequency differences create high differences on the coupling of energy from the reader to the transponder and transmit less energy from the transponder to the reader. This not only reduces the maximum reading distance but also results in variations of maximum reading distance between transponders.

For this reason, more precise resonant frequency is necessary for a high Q resonant circuit maximize the reading distance and to minimize the differences between transponders.

In addition to problems of controlling resonant frequency due to variations caused by differences between transponder coils, problems can also result from variations in the associated electronic components. Thus, for example, the ICs (integrated Circuits) employed, have capacitors that affect the resonant frequencies and tolerance variations between the capacitor ICs, therefore, will cause variations in resonant frequency of the transponders.

The variations in coil electrical parameters and/or variations caused by electrical component tolerances necessitate an effective technique for adjusting resonant frequencies before during or after manufacturing.

SUMMARY OF THE INVENTION

It is an object of the invention to provide RF air coils with precise impedance and to methods of making the same.

It is also an object of the invention to provide a method for adjusting resonant frequency of RF air coil transponders during and/or after production of the transponders.

In accordance with an aspect of the invention, using rigid carriers, such as rigid reels, reduces the impedance tolerances of air coils. The rigid carriers enable uniform winding of the coil.

In accordance with another aspect of the invention, a body made of a material, which influences the magnetic field, and/or electric field is provided. The shape, size, composition and/or position of the body are adjusted to change inductance and internal parasitic capacitance of the coil, thereby adjusting the resonant frequency of the transponder resonant circuit.

Other features and advantages of the present invention will become apparent from the following description of the invention which refers to the accompanying drawings.

BRIEF DESCRIPTION OF THE DRAWING(S)

DETAILED DESCRIPTION OF THE PREFERRED EMBODIMENTS

Figure 1:
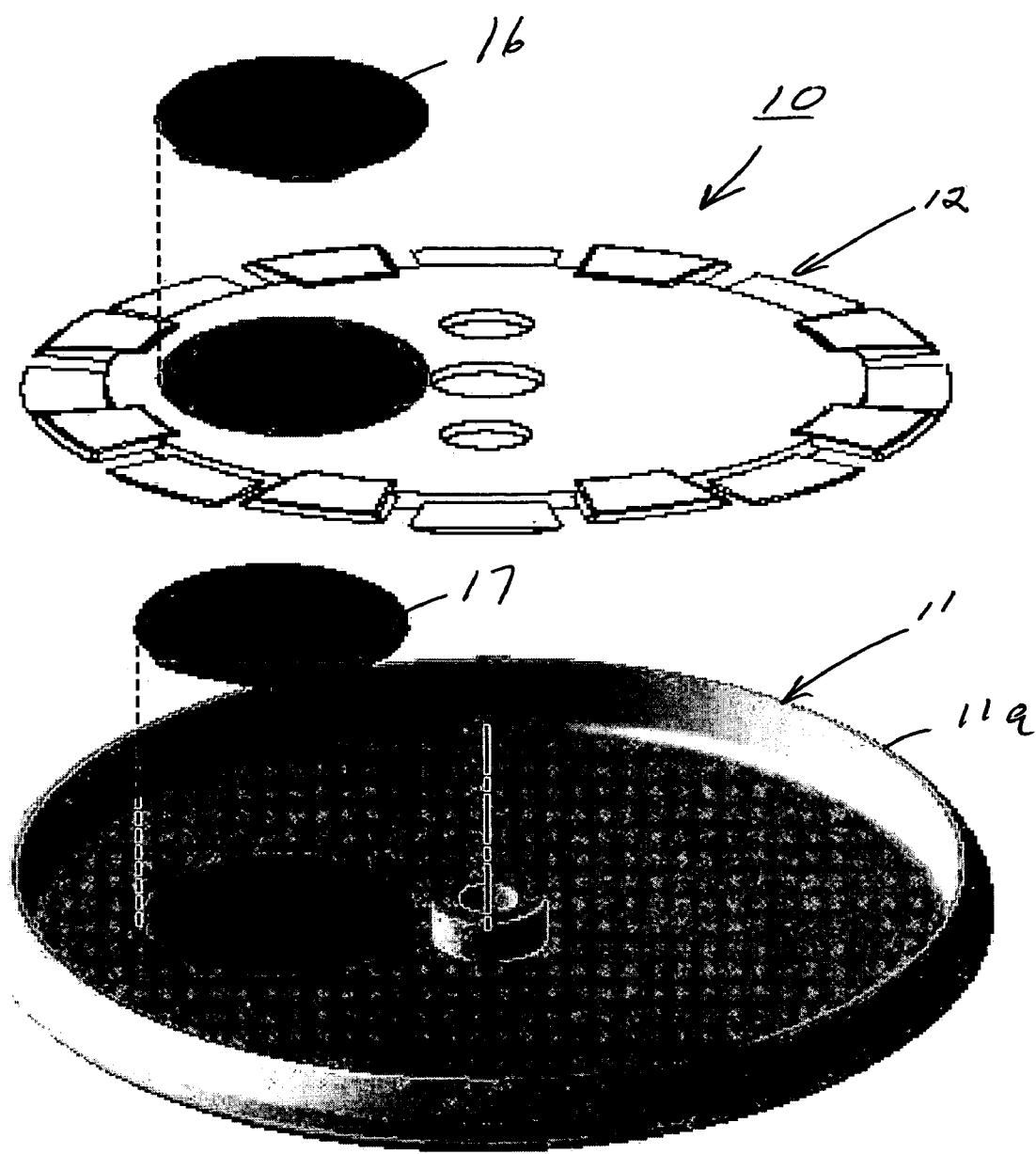
FIG. 1 is an exploded, perspective view, with parts removed for the sake of clarity of a transponder illustrating certain features of the present invention.
Figure 2:
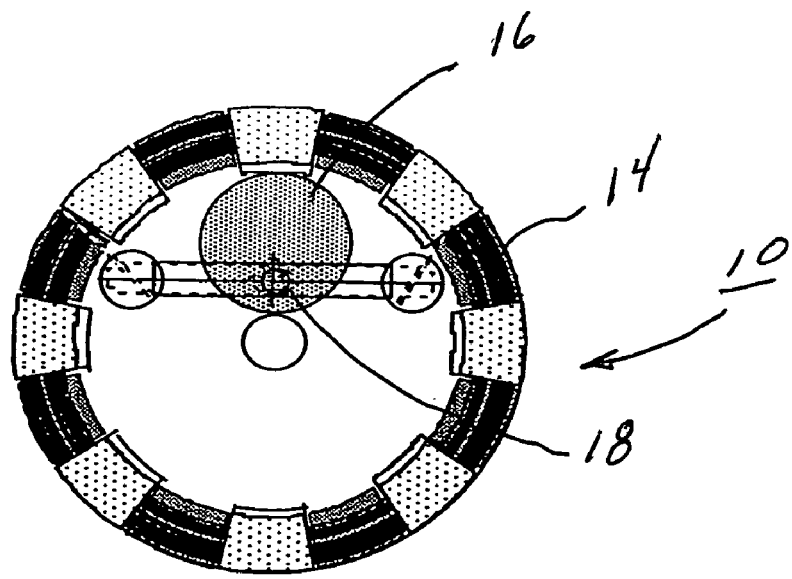
FIG. 2 is a cross-sectional plan view of a carrier forming part of the transponder of FIG. 1.

Referring now to the drawings and, in particular, to FIGS. 1 and 2, there is shown an RF air coil transponder 10 having a casing 11 (only the lower half of which is shown) and a rotatable carrier in the form of a rigid reel 12 made of a suitable electrically insulating material, such as plastic, e.g., PPS, mounted within the casing 11. Like the reel 12, the casing 11 may also be made of plastic, such as PPS. Advantageously, the requisite rigidity of the reel 14 is achieved by making the reel 12 solid. A coil 14 is wound about the reel 12. At least one body 16 for influencing the field, either electrical or magnetic, within the coil 14 is mounted on the reel 12. Although in this embodiment, the body 16 has a cylindrical shape, the body 16 may have any shape and may be composed of any suitable field influencing material, such as magnetic metals or ferrites. Aluminum has proven to be an effective material. Additionally, although only one body 16 is shown, in the practice of the invention one or more field influencing bodies 16 may be mounted on the reel 12. Another field influencing body 17 is affixed to the lower half 11a of the casing 11. Like the body 16, the body 17 may have any shape and may be composed of any suitable material, such as aluminum. An IC (Integrated Circuit) 18 containing electrical components of transponder 10 is attached to the reel 12.

Figure 3:
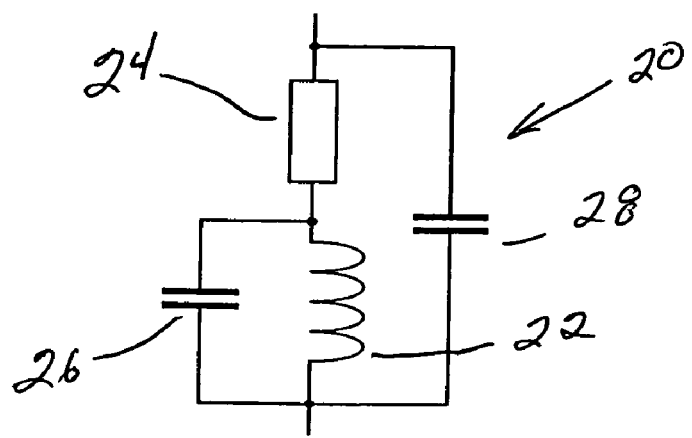
FIG. 3 is an equivalent circuit of a coil forming part of the transponder of FIG. 1.

Referring to FIG. 3, there is shown an equivalent circuit 20 of the coil 14. The equivalent circuit 20 includes an inductor 22 representing the inductance of the coil 14, a resistor 24 representing the internal resistance of the coil 14, and capacitors 26 and 28 representing the internal parasitic capacitances of the coil 14. The inductor 22, the resistor 24 and the capacitors 26 and 28 constitute the impedance of the coil 14.

The resonant frequency of the coil 14 is a function of, among other things, the respective values of the inductor 22 and capacitors 26 and 28. In turn, these values, as is well known, are functions of, among other things, the distances between windings of the coil 14 and the form of the coil 14. Thus, if each transponder 10 had the same distance between the windings of the coil 14 and the same coil form, the values of the inductor 22 and capacitors 26 and 28 of the coil 14 of each transponder would be essentially the same, as would the resonant frequency. Unfortunately, the design of prior art transponders and their manufacture has not been such as to provide to uniform values. The present invention, however, enables such uniform values to be achieved.

Thus, the rigidity of the reel 12 enables the coil 14 to keep its form and guarantees precise distances between windings, especially when a winding machine forms the coil. This, in turn, enables constant values of inductance and parasitic capacitance, which, in turn, results in a constant resonant frequency.

As noted above, the bodies 16 and 17 influences the magnetic and/or electric field and, consequently, the total impedance of the coil 14 and the resonant frequency.

The ability of the bodies 16 and 17 to influence the magnetic field and/or electric field not only depends, as noted above, on the type of material from which the bodies 16 and 17 are made and their shape, particularly their surface areas, but also the angular position of the body 16.

Figure 4:
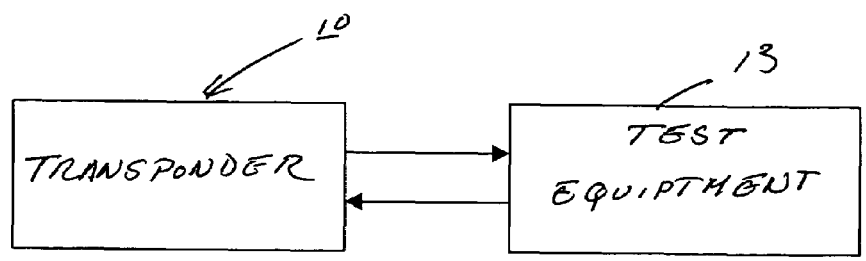
FIG. 4 is a block diagram showing a transponder being tested to determine its resonant frequency.
Figures 5A, 5B, 5C, 5D:
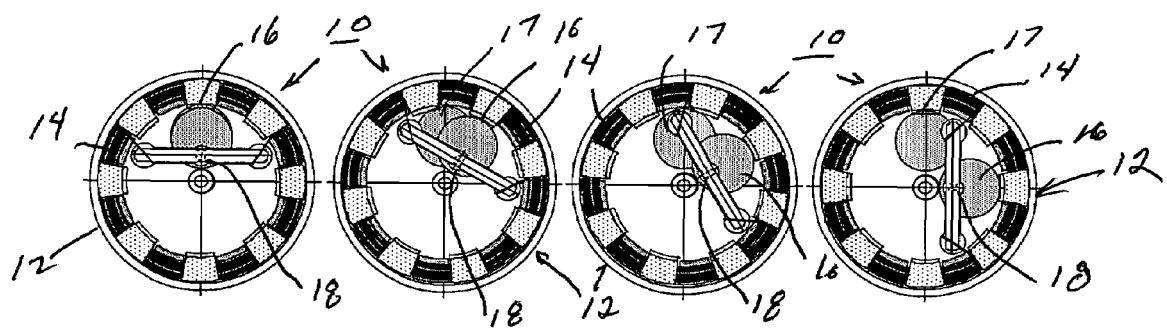
FIGS. 5a-5d are cross-sectional views showing the different orientation of the transponder carrier corresponding to different resonant frequencies.

In accordance with the present invention, the shape and composition of the bodies 16 and 17 are selected to achieve a desired resonant frequency. The resonant frequency of the transponder 10 is then tested, as seen in FIG. 4, with suitable test equipment 30. If the results of the testing indicate that the transponder 10 under test does not have the desired resonant frequency, the angular position of the body 16 is changed by rotating the carrier.

Referring to FIGS. 5a-5d, there are shown different angular positions of the body 16. Changing the position of the body 16, changes the impedance of the resonant circuit 20 and, hence, changes the resonant frequency of the transponder 10. More specifically, changing the position of the body 16 with respect to the body 17 changes the combined surface areas of the bodies 16 and 17. Changing the combined surface areas, in turn, changes the impedance of the coil 14. More specifically, the greater the combined surface areas, the higher the impedance. Thus, the combined surface areas of the bodies 16 and 17 in FIG. 5b have more surface area than in FIG. 5a. As a result, the resonant circuit 20 of transponder 10 of FIG. 5b has more impedance than the resonant circuit 20 of the transponder 10 of FIG. 5a and consequently a lower resonant frequency. Similarly, the resonant circuit 20 of the transponder 10 of FIG. 5c has more impedance than the transponder 10 of FIG. 5b and consequently a lower resonant frequency. The position of the body 16 shown in FIG. 5d results in the greatest combined surface areas and thus the resonant circuit 20 of FIG. 5d has higher impedance than the resonant circuits of FIGS. 5a-5c, resulting in the lowest resonant frequency. Thus, adjusting the position of the body 16 in a clockwise direction decreases the resonant frequency of the transponder 10 relative to the position before.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. An RF transponder comprising:
    a rotatable carrier;
    a coil wound about the carrier; and
    at least one field influencing body supported by the carrier within the coil, wherein an angular position, a shape, a composition, a size, and/or a surface area of the body influences the resonant frequency of the transponder.

2. An RF transponder according to claim 1, wherein the angular position of the body influences the resonant frequency of the transponder.

3. An RF transponder according to claim 1, wherein the shape of the body influences the resonant frequency of the transponder.

4. An RF transponder according to claim 1, wherein the composition of the body influences the resonant frequency of the transponder.

5. An RF transponder according to claim 1, wherein the size of the body influences the resonant frequency of the transponder.

6. An RF transponder according to claim 1, wherein the surface area of the body influences the resonant frequency of the transponder.

7. An RF transponder according to claim 1, including electrical components supported by the carrier.

8. An RF transponder according to claim 7, wherein the electrical components are embodied in an integrated circuit.

9. An RF transponder according to claim 4, wherein the body is composed of a magnetic material.

10. An RF transponder according to claim 9, wherein the magnetic material is aluminum.

11. An RF transponder comprising:
    a casing;
    a rotatable carrier disposed within the casing and rotatable with respect thereto;
    a coil wound about the carrier;
    at least one first field influencing body supported by the carrier within the coil; and
    at least one second field influencing body affixed to the casing.

12. An RF transponder according to claim 11, including electrical components supported by the carrier.

13. An RF transponder according to claim 12, wherein the electrical components are embodied in an integrated circuit.

14. An RF transponder according to claim 11, wherein the first and second bodies are composed of a magnetic material.

15. An RF transponder according to claim 11, wherein each of the first and second bodies is composed of aluminum.

16. An RF transponder comprising:
    a casing;
    a coil disposed within the casing;
    at least one moveable field influencing body within the coil; and
    at least one fixed field influencing body with the coil.

17. A method of manufacturing an RF transponder comprising:
    providing a rotatable carrier;
    winding a coil about the carrier;
    providing a casing:
    disposing the rotatable carrier rotatably within the casing;
    providing at least one first field inducing body supported by the carrier within the coil; and providing at least one second field influencing body affixed to the casing.

18. A method of manufacturing an RF transponder comprising:
   providing a casing;
   providing a coil disposed within the casing;
   providing at least one moveable field influencing body within the coil; and
   providing at least one fixed field influencing body with the coil.

19. A method of manufacturing an RF transponder comprising:
   providing a rotatable carrier;
   winding a coil about the carrier; and
   providing at least one field influencing body supported by the carrier within the coil, wherein an angular position, a shape, a composition, a size, and/or a surface area of the body influences the resonant frequency of the transponder.

20. The method of claim 19, wherein the angular position of the body influences the resonant frequency of the transponder.

21. The method of claim 19, wherein the shape of the body influences the resonant frequency of the transponder.

22. The method of claim 19, wherein the composition of the body influences the resonant frequency of the transponder.

23. The method of claim 19, wherein the size of the body influences the resonant frequency of the transponder.

24. The method of claim 19, wherein the surface area of the body influences the resonant frequency of the transponder.

25. The method of claim 19, including attaching electrical components to the carrier.

26. The method of claim 25, wherein the electrical components are embodied in an integrated circuit.

27. The method of claim 19, wherein the body is composed of a magnetic material.

28. The method of claim 27, wherein the magnetic material is aluminum.

29. A method of adjusting the resonant frequency of an RF transponder to a desired value, the RF transponder having a rotatable carrier, a coil wound about the carrier and at least one field influencing body supported by the carrier, which method comprises:
   measuring a resonant frequency of the transponder; and
   if the resonant frequency is not at the desired value, changing the angular position of the body such that the transponder has the desired resonant frequency.

30. The method of claim 29, wherein the carrier is rotatable and the angular position of the body is changed by rotating the carrier.

31. A method of adjusting the resonant frequency of an RF transponder to a desired value, the RF transponder having a casing, a coil disposed within the casing, at least one movable field influencing body within the coil, and at least one fixed field influencing body disposed with one coil, which method comprises:
   measuring a resonant frequency of the transponder; and
   if the resonant frequency is not at the desired value, changing the position of the at least one movable field influencing body such that the transponder has the desired resonant frequency.

32. The method of claim 31, wherein the at least one movable body is mounted on a rotatable carrier and the position of the at least one movable body is changed by rotating the carrier.

* * * * *